United States Patent [19]
Ujihara

[11] Patent Number: 5,433,522
[45] Date of Patent: Jul. 18, 1995

[54] HYDRAULIC CONTROL DEVICE FOR CLOSED TYPE KNEADER

[75] Inventor: Toshio Ujihara, Takasago, Japan

[73] Assignee: Kabushiki Kaisha Kobe Seiko Sho, Kobe, Japan

[21] Appl. No.: 141,640

[22] Filed: Oct. 27, 1993

[30] Foreign Application Priority Data

Oct. 27, 1992 [JP] Japan .................. 4-312946

[51] Int. Cl.$^6$ ................. B28C 7/16; B01F 15/02
[52] U.S. Cl. ....................... 366/77; 366/192; 277/3; 425/201; 425/204
[58] Field of Search ............. 366/69, 76, 77, 79, 366/83, 84, 85, 184, 189, 192; 277/3; 425/201, 204

[56] References Cited

U.S. PATENT DOCUMENTS

| | | | |
|---|---|---|---|
| 2,615,689 | 10/1952 | Schnuck | 366/194 |
| 2,972,774 | 2/1961 | MacLeod | 366/184 |
| 3,005,229 | 10/1961 | Walther | 366/184 |
| 3,282,592 | 11/1966 | Cymbalisty | 277/3 |
| 4,412,747 | 11/1983 | Moriyama | 366/64 |
| 4,818,113 | 4/1989 | Patel | 366/79 |
| 5,061,078 | 10/1991 | Yada | 366/77 |

*Primary Examiner*—David A. Scherbel
*Assistant Examiner*—Randall E. Chin
*Attorney, Agent, or Firm*—Oblon, Spivak, McClelland, Maier, & Neustadt

[57] ABSTRACT

A hydraulic control device for a closed type kneader, including a sealing surface pressure applying circuit for applying a sealing surface pressure to a sealing device for sealing a rotor accommodated in a kneading chamber, a drop door driving circuit for controlling an opening and closing operation of a drop door for closing a bottom surface of the kneading chamber, and a power circuit for supplying a pressure oil to the sealing surface pressure applying circuit and the drop door driving circuit. The sealing surface pressure applying circuit is connected to a pressure oil supply line in the drop door driving circuit for a closed condition of the drop door. Accordingly, when the application of the sealing surface pressure is unnecessary, that is, when the drop door is opened, the sealing surface pressure is prevented from being applied to the sealing device, thereby extending the life of the sealing device.

3 Claims, 4 Drawing Sheets

HYDRAULIC CONTROL DEVICE FOR CLOSED TYPE KNEADER

BACKGROUND OF THE INVENTION

The present invention relates to a hydraulic control device for a closed type kneader, and more particularly to such a hydraulic control device including a sealing surface pressure applying circuit for applying a sealing surface pressure to a sealing device for rotors accommodated in a kneading chamber.

FIG. 4 shows a conventional hydraulic control device 48 for a closed type kneader for kneading rubber or the like. The hydraulic control device 48 is so designed as to drive a hydraulic cylinder 18 for generating a sealing surface pressure to be applied to a sealing device, a rotary actuator 40 for opening and closing a drop door 15, and a hydraulic cylinder 45 for operating a latch 16 for locking and unlocking the drop door 15 in its closed condition.

The structure and the operation of a closed type kneader incorporating the hydraulic cylinders 18 and 45 and the rotary actuator 40 will now be described with reference to FIGS. 2 and 3. FIG. 2 is a sectional side view of a closed type kneader 27, and FIG. 3 is an elevational view in section of a sealing device 25 for rotors 14. Referring to FIG. 2, the closed type kneader 27 includes a kneading chamber 10, material charge port 11, floating weight 12, housing 13 defining the kneading chamber 10 therein, two rotors 14, drop door 15, latch 16, and material discharge port 17.

The kneading chamber 10 is defined by the housing 13, a lower portion of the floating weight 12, and a door top 15a of the drop door 15. The kneading chamber 10 is so designed as to form a closed space therein having a double-cylindrical shape such that two circles as viewed in section are connected to make two cylindrical spaces communicating with each other. The two rotors 14 are rotatably accommodated in the kneading chamber 10 so as to rotate ill opposite directions.

A vertically elongated chute (not shown) is connected with the material charge port 11. The floating weight 12 is vertically moved in the chute to force the material through the material charge port 11 into the kneading chamber 10.

Referring to FIG. 3, each rotor 14 has Journal portions 14a at the opposite ends (one of which being shown for convenience), and opposite side plates 23 are mounted on the housing 13 (one of which being shown correspondingly). The journal portions 14a of each rotor 14 are rotatably supported at openings 24 formed through the opposite side plates 23, and each rotor 14 is rotated to knead the material in the kneading chamber 10 as if sweeping the inner wall surface of the kneading chamber 10.

As shown in FIG. 2, the drop door 15 is pivotably supported at a point 15b so as to vertically swing. During kneading of the material, the drop door 15 is upwardly swung about the point 15b so that the door top 15a of the drop door 15 shuts the material discharge port 17 to form the bottom of the kneading chamber 10. After kneading of the material, the drop door 15 is downwardly swung about the point 15b as shown by a phantom line in FIG. 2 so that the door top 15a opens the material discharge port 17 to allow the discharge of the material from the material discharge port 17. The opening and closing operation of the drop-door 15 is effected by the rotary actuator 40, and the operation of the rotary actuator 40 is effected by a drop door driving circuit D.

The latch 16 serves to lock the drop door 15 in the closed condition. During kneading of the material, the latch 16 is advanced to support and lock the drop door 15, thereby keeping the closed condition of the drop door 15. After kneading of the material, the latch 16 is retracted to unlock the drop door 15, thereby allowing the drop door 15 to be opened. The advancing and retracting operation of the latch 16 is effected by the hydraulic cylinder 45, and the operation of the hydraulic cylinder 45 is effected by the drop door driving circuit D commonly used for the rotary actuator 40.

As shown in FIG. 3, the sealing device 25 is constructed of a mechanical seal having a sealing ring 21. The sealing ring 21 is so designed as to sealingly abut against a collar ring 22 fitted with the journal portion 14a of each rotor 14 at each end. A sealing surface pressure to be applied to the sealing ring 21 is generated by the hydraulic cylinder 18 and is transmitted through a yoke 20 to the sealing ring 21. The collar ring 22 and the sealing ring 21 are disposed within the opening 24 of the side plate 23 on each side of the kneading chamber 10. The sealing device 25 is further provided with a lubricating mechanism 26 for supplying a lubricating oil to a sealing surface of the sealing ring 21 to thereby facilitate the rotation of each rotor 14 and prevent the wear of the sealing surface.

The yoke 20 is pivotably supported by a yoke pin 20a to the side plate 23 on each side. The hydraulic cylinder 18 is connected to the upper end of the yoke 20, and two pressure pins 20b are mounted at the lower end of the yoke 20. When the hydraulic cylinder 18 is operated in a rightward direction depicted by an arrow A in FIG. 3 against a mechanical spring 19, the two pressure pins 20b are correspondingly operated to urge the sealing ring 21 in a leftward direction as viewed in FIG. 3. Each pressure pin 20b is threadedly engaged with the yoke 20 so as to be adjustable in position. The operation of the hydraulic cylinder 18 for operating the sealing device 25 is effected by a sealing surface pressure applying circuit C.

Referring back to FIG. 4, there is shown a circuit diagram of the conventional hydraulic control device 48 including the drop door driving circuit D and the sealing surface pressure applying circuit C mentioned above. The hydraulic control device 48 further includes a power circuit A and an accumulator circuit B in addition to the sealing surface pressure applying circuit C and the drop door driving circuit D. The sealing surface pressure applying circuit C and the drop door driving circuit D are independently connected to the power circuit A.

In the power circuit A, a pressure oil drawn from a tank 28 by a pump 29 is supplied through a check valve 30 separately to the accumulator circuit B, the sealing surface pressure applying circuit C, and the drop door driving circuit D. A relief valve 31 is provided between the pump 29 and the check valve 30. A relief pressure in the relief valve 31 is set to 55 kg/cm$^2$, for example, so that when the hydraulic pressure exceeds the set value of 55 kg/cm$^2$, the pressure oil is returned through the relief valve 81 to the tank 28.

In the accumulator circuit B, when the hydraulic pressure becomes higher than an upper limit of 50 kg/cm$^2$, for example, a switch 33 is operated to stop the rotation of the pump 29, whereas when the hydraulic pressure becomes lower than a lower limit of 45 kg/cm², for example, the switch 33 is operated again to drive the pump 29, thus maintaining a given range of the hydraulic pressure to be applied to the sealing surface pressure applying circuit C and the drop door driving circuit D. Further, reference numeral 32 denotes an accumulator storing oil having a given pressure or more, for suppressing undue fluctuations in hydraulic pressure and oil flow to be caused in operating the switch 33.

In the drop door driving circuit D, the pressure oil supplied from the power circuit A is divided to flow into a line 37 for controlling the opening and closing operation of the drop door 15 and a line 38 for controlling the advancing and retracting operation of the latch 16 for locking and unlocking the drop door 15.

The pressure oil flowing in the line 37 for controlling the opening and closing operation of the drop door 15 is supplied through a selector valve 39 to the rotary actuator 40 for operating the drop door 15. When the selector valve 39 is in a position "a", the pressure oil flows into a line 41 and is supplied to the rotary actuator 40 to thereby close the drop door 15. When the selector valve 39 is in a position "b", the pressure oil flows into a line 42 and is supplied to the rotary actuator 40 to thereby open the drop door 15.

On the other hand, the pressure oil flowing in the line 38 for controlling the advancing and retracting operation of the latch 16 is supplied through a check valve 43 and a selector valve 44 to the hydraulic cylinder 45 for operating the latch 16. When the selector valve 44 is in a position "a", the pressure oil flows into a line 46 and is supplied to the hydraulic cylinder 45 to thereby advance the latch 16 and lock the drop door 15 in the closed condition thereof. When the selector valve 44 is in a position "b", the pressure oil flows into a line 47 and is supplied to the hydraulic cylinder 45 to thereby retract the latch 16 and unlock the drop door 15.

The selection of either the positions "a" or "b" of the selector valve 39 and the selector valve 44 is performed in the following manner. That is, when the material is supplied to the kneader 27 and is kneaded in the kneading chamber 10, both the positions "a" of the selector valves 39 and 44 are selected to allow the pressure oil to flow into the lines 41 and 46, respectively, thereby closing the drop door 15 and then locking it. On the other hand, when the kneading of the material is ended to discharge the kneaded material out of the kneading chamber 10, both the positions "b" of the selector valves 39 and 44 are selected to allow the pressure oil to flow into the lines 42 and 47, respectively, thereby unlocking the drop door 15 and then opening it.

In the sealing surface pressure applying circuit C, the pressure oil supplied from the power circuit A is passed through a check valve 34 and a relief valve 35 to the hydraulic cylinder 18. In this circuit C, a fixed pressure of the pressure oil set by the relief valve 35 is applied to the hydraulic cylinder 18, so that a fixed sealing surface pressure is always applied to the sealing device 25 for the rotors 14. A return oil from the hydraulic cylinder 18 is allowed to flow through a line 36 to the tank 28.

Thus, in the sealing surface pressure applying circuit C of the conventional hydraulic control device 48, the fixed sealing surface pressure is always applied to the sealing device 25 for the rotors 14 because the fixed hydraulic pressure is always applied to the hydraulic cylinder 18. In other words, even when the drop door 15 is opened to discharge the material out of the kneading chamber 10, the fixed sealing surface pressure is still applied to the sealing device 25. Furthermore, when the drop door 15 is opened to discharge the material out of the kneading chamber 10, an internal pressure in the kneading chamber 10 is reduced, and accordingly an undue sealing surface pressure is applied to the sealing device 25. As a result, the wear of the sealing ring 21 in the sealing device 25 is accelerated to shorten the life.

To cope with this problem, there has conventionally been proposed a sealing device capable of controlling a sealing surface pressure by providing detecting means for detecting changes in a kneading chamber (see Japanese Patent Laid-open Publication No. 60-78631). For example, the sealing surface pressure is controlled by indirectly detecting changes in the kneading chamber 10 with use of a thermometer, wattmeter, timer, etc. conventionally provided in the closed type kneader 27 shown in FIG. 2.

However, in hydraulically controlling the sealing surface pressure to be applied to the sealing device, it is necessary to provide a proportional electromagnetic pressure reducing valve or the like for changing a hydraulic pressure according to a signal from the detecting means such as a thermometer, wattmeter, timer, etc. Furthermore, in controlling the proportional electromagnetic pressure reducing valve according to the signal from the detecting means, it is necessary to additionally provide a signal processing mechanism for transforming the signal from the detecting means into a signal waveform readily controllable. Thus, the hydraulic control device becomes very large in scale.

SUMMARY OF THE INVENTION

It is accordingly an object of the present invention to provide a hydraulic control device for a closed type kneader, which is simple in construction and can prevent a sealing surface pressure from being applied to a sealing device when the application of the sealing surface pressure is unnecessary, that is, when the drop door is opened.

According to the present invention, there is provided in a hydraulic control device for a closed type kneader, including a sealing surface pressure applying circuit for applying a sealing surface pressure to a sealing device for sealing a rotor accommodated in a kneading chamber, a drop door driving circuit for controlling an opening and closing operation of a drop door for closing a bottom surface of said kneading chamber, and a power circuit for supplying a pressure oil to said sealing surface pressure applying circuit and said drop door driving circuit; the improvement wherein said sealing surface pressure applying circuit is connected to a pressure oil supply line in said drop door driving circuit for a closed condition of said drop door.

As described above, the hydraulic control device of the present invention is improved in that the sealing surface pressure applying circuit is connected to the pressure oil supply line in the drop door driving circuit for the closed condition of the drop door. Thus, by utilizing the conventional hydraulic control device with a simple construction and changing a position of connection of the sealing surface pressure applying circuit, the application of the sealing surface pressure to the sealing device can be stopped or started in concert with the opening control or the closing control of the drop door. Accordingly, when the application of the sealing surface pressure to the sealing device is unnecessary, that is, when the drop door is opened, the sealing surface pressure can be prevented from being applied to the sealing device, thereby extending the life of the sealing device.

Other objects and features of the invention will be more fully understood from the following detailed description and appended claims when taken with the accompanying drawings.

DETAILED DESCRIPTION OF THE PREFERRED EMBODIMENTS

Figure 1:
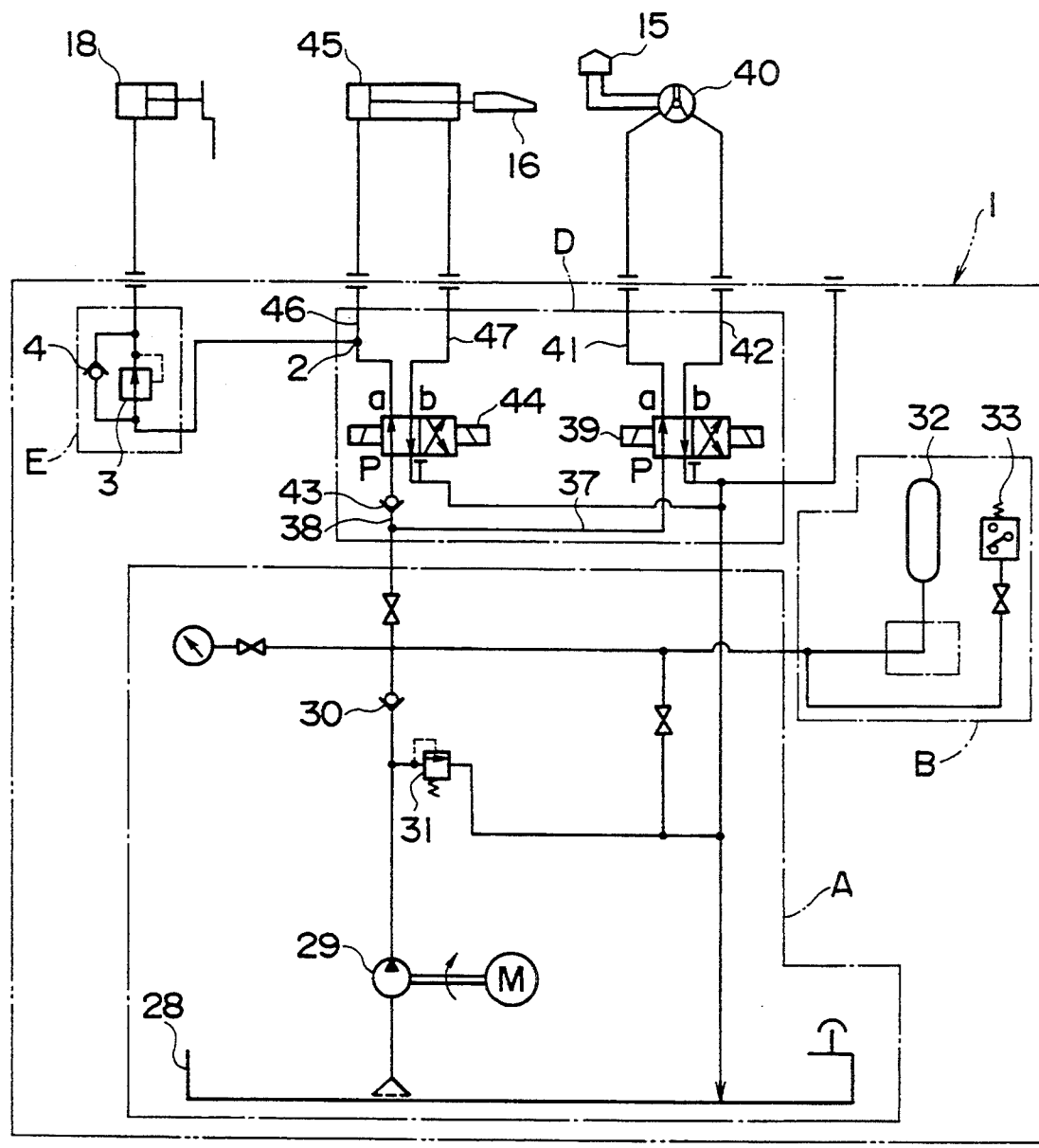
FIG. 1 is a circuit diagram of a hydraulic control device for a closed type kneader according to the present invention.
Figure 2:
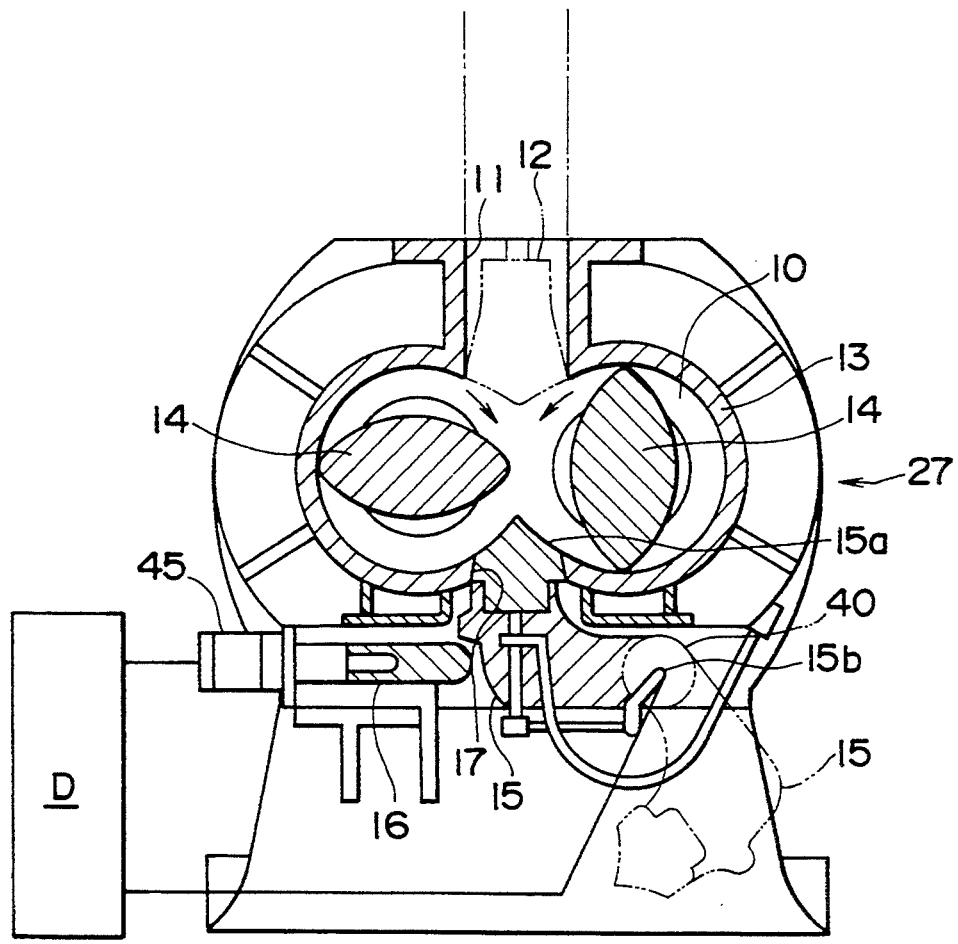
FIG. 2 is a sectional side view of a closed type kneader to which the present invention is applicable.
Figure 3:
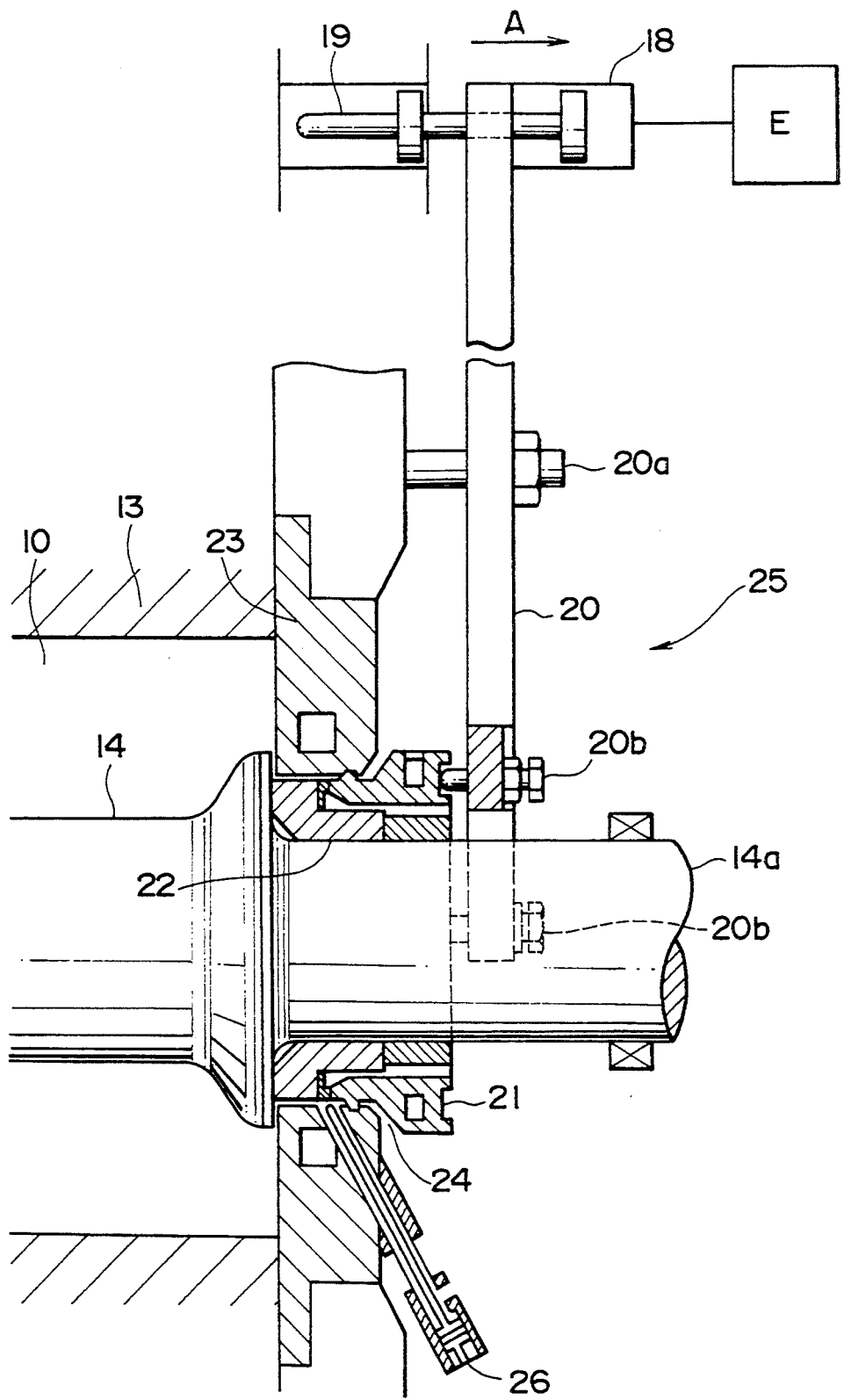
FIG. 3 is an elevational view in section of a sealing device for rotors provided in the closed type kneader shown in FIG. 2.

Referring to FIG. 1, there is shown a circuit diagram of a hydraulic control device according to a preferred embodiment of the present invention. Ill this preferred embodiment, the hydraulic control device is applied to the closed type kneader 27 shown in FIG. 2. Further, the same functional parts as those shown in FIGS. 2 to 4 are denoted by the same reference numerals and characters, and the explanation thereof will be hereinafter omitted to avoid duplication.

Figure 4:
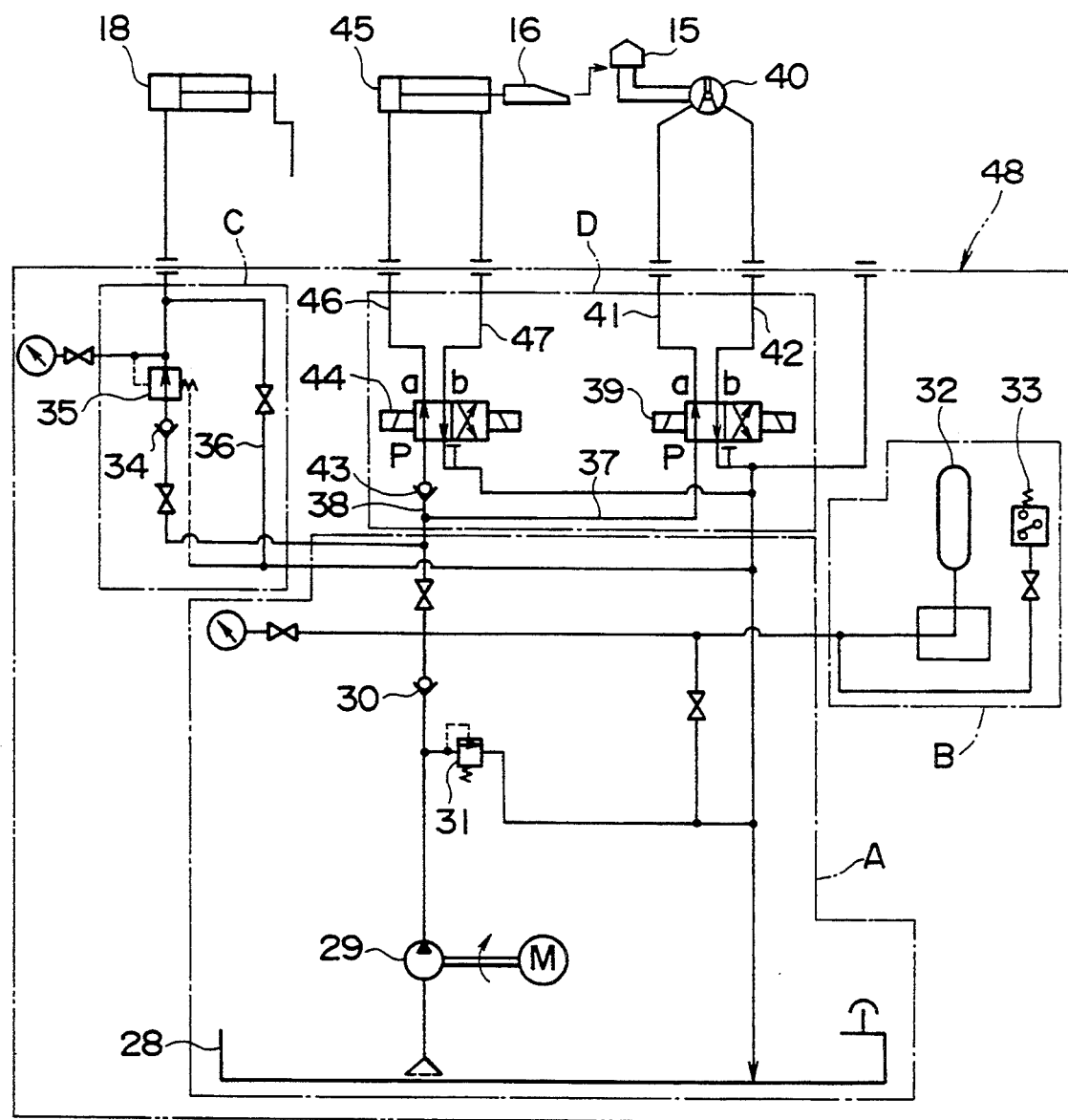
FIG. 4 is a circuit diagram of a conventional hydraulic control device for a closed type kneader.

The hydraulic control device denoted by reference numeral 1 in FIG. 1 is different from,the conventional hydraulic control device 48 shown in FIG. 4 in the point that a sealing surface pressure applying circuit E is substituted for the sealing surface pressure applying circuit C. More specifically, the sealing surface pressure applying circuit E is simply constructed of a relief valve 3 and a check valve 4, and is connected at a point 2 to a pressure oil supply line 46 in a drop door driving circuit D. The pressure oil supply line 46 is used to make a latch 16 lock a drop door 15 in a closed condition thereof.

The operation of the drop door driving circuit D in relation to the sealing surface pressure applying circuit E will now be described. A pressure oil supplied from a power circuit A is divided to flow into a line 37 for controlling the opening and closing operation of the drop door 15 and a line for controlling the advancing and retracting operation of the latch 16 for locking and unlocking the drop door 15. The pressure oil flowing in the line 38 is supplied through a check valve 43 and a selector valve 44 to a hydraulic cylinder 45 for operating the latch 16, and is also supplied to the sealing surface pressure applying circuit E. A return oil from a hydraulic cylinder 18 is allowed to flow through the check valve 4 to the line 46, then being returned through the selector valve 44 in its position "b" to a tank 28.

When the selector valve 44 is in a position "a", the pressure oil is supplied through the line 46 to the hydraulic cylinder 45. Then, the latch 16 is advanced by the hydraulic cylinder 45 to lock the drop door 15 in the closed condition. At the same time, the pressure oil flowing in the line 46 is also supplied to the sealing surface pressure applying circuit E. Then, the pressure oil is supplied through the relief valve 3 to the hydraulic cylinder 18, which in turn operates to apply a sealing surface pressure to a sealing device 25 for rotors 14.

When the selector valve 44 is in a position "b", the pressure oil is supplied through a line 47 to the hydraulic cylinder 45. Then, the latch 16 is retracted by the hydraulic cylinder 45 to unlock the drop door 15. At this time, no pressure oil is supplied to the line 46, and the oil in the hydraulic cylinder 18 is returned through the check valve 4 in the sealing surface pressure applying circuit E and the check valve 44 to the tank 28. Accordingly, the hydraulic pressure in the hydraulic cylinder 18 is reduced to stop the application of the sealing surface pressure to the sealing device 25.

As mentioned above, in the hydraulic control device 1 for the closed type kneader according to the present invention, the sealing surface pressure applying circuit E is connected to the pressure oil supply line 46 in the drop door driving circuit D for locking the drop door 15 in the closed condition. Accordingly, with a simple hydraulic control circuit construction similar to that in the prior art, the application of the sealing surface pressure to the sealing device by the sealing surface pressure applying circuit E can be stopped or started in concert with the opening control or the closing control of the drop door 15. As a result, when the function of the sealing device 25 for the rotors 14 is not required, that is, when the drop door 15 is opened, no sealing surface pressure is applied to the sealing device 25, thereby extending the life of the sealing device 25, especially, the sealing ring 21.

While the sealing surface pressure applying circuit E is connected to the pressure oil supply line 46 in the drop door driving circuit D for locking the drop door 15 in the closed condition in the above preferred embodiment, the circuit E may be connected to a pressure oil supply line 41 in the drop door driving circuit D for closing the drop door 15.

In this case, when a selector valve 39 is in a position "a", the pressure oil flowing in the line 37 is supplied through the line 41 to a rotary actuator 40, thereby closing the drop door 15. At the same time, the pressure oil flowing in the line 41 is also supplied to the sealing surface pressure applying circuit E, then being supplied through the relief valve 3 to the hydraulic cylinder 18, thereby applying a sealing surface pressure to the sealing device 25. On the other hand, when the selector valve 39 is in a position "b", the pressure oil flowing in the line 37 is supplied through a line 42 to the rotary actuator 40, thereby opening the drop door 15. At this time, no pressure oil is supplied to the line 41, and the oil in the hydraulic cylinder 18 is returned through the line 41 to the tank 28. Accordingly, the hydraulic pressure in the hydraulic cylinder 18 is reduced to stop the application of the sealing surface pressure to the sealing device 25.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A closed type kneader having a hydraulic control device, comprising:
   a housing defining a kneading chamber having a bottom surface and at least one rotor accommodated in said kneading chamber;

a sealing device for sealing said at least one rotor;

a drop door having an actuator, said drop door closing said bottom surface of said kneading chamber; and a hydraulic control device comprising a sealing surface pressure applying circuit for applying a sealing surface pressure to said sealing device, a drop door driving circuit for controlling an opening and closing operation of said drop door, said drop door driving circuit including a pressure oil supply line which supplies pressurized oil to the actuator of said drop door when said drop door is in a closed condition, and a power circuit for supplying pressurized oil to said sealing surface pressure applying circuit and said drop door driving circuit, wherein said sealing surface pressure applying circuit is connected to said pressure oil supply line in said drop door driving circuit for a closed condition of said drop door.

2. The closed type kneader of claim 1 wherein said pressure oil supply line supplies pressurized oil to lock the drop door.

3. The closed type kneader of claim 1 wherein said pressure oil supply line supplies pressurized oil to close the drop door.

* * * * *